United States Patent
Maeda

(10) Patent No.: US 7,661,332 B2
(45) Date of Patent: Feb. 16, 2010

(54) WORM REDUCER AND ELECTRIC POWER STEERING APPARATUS

(75) Inventor: Atsushi Maeda, Gunma (JP)

(73) Assignee: NSK Ltd., Tokyo (JP)

( * ) Notice: Subject to any disclaimer, the term of this patent is extended or adjusted under 35 U.S.C. 154(b) by 110 days.

(21) Appl. No.: 11/715,456

(22) Filed: Mar. 8, 2007

(65) Prior Publication Data

US 2007/0221004 A1    Sep. 27, 2007

(30) Foreign Application Priority Data

Mar. 8, 2006  (JP) .............................. 2006-062281

(51) Int. Cl.
*F16H 1/16* (2006.01)
(52) U.S. Cl. ..................... 74/425; 74/388 PS
(58) Field of Classification Search ................... 74/425, 74/388 PS, 492, 493
See application file for complete search history.

(56) References Cited

U.S. PATENT DOCUMENTS

| | | | |
|---|---|---|---|
| 1,902,683 A | 3/1933 | Wildhaber | |
| 2,935,887 A | 5/1960 | Wildhaber | |
| 4,665,763 A * | 5/1987 | James | 74/425 |
| 6,053,061 A | 4/2000 | Furukawa et al. | |
| 6,776,064 B2 | 8/2004 | Bucholz et al. | |
| 2005/0172744 A1* | 8/2005 | Koyama et al. | 74/425 |
| 2006/0005653 A1* | 1/2006 | Fleytman | 74/425 |

FOREIGN PATENT DOCUMENTS

| | | |
|---|---|---|
| DE | 917529 C | 9/1954 |
| EP | 1 775 048 A1 | 4/2007 |
| WO | 2007-062977 A1 | 6/2007 |

OTHER PUBLICATIONS

German Office Action dated Sep. 29, 2009.

* cited by examiner

*Primary Examiner*—David M Fenstermacher
(74) *Attorney, Agent, or Firm*—Sughrue Mion, PLLC

(57) ABSTRACT

In a worm reducer for reducing the rotation transmitted to a worm and transmitting the reduced rotation to a worm wheel, the worm reducer being composed of the worm with screw faces formed on its outer periphery and the worm wheel with worm wheel teeth formed on its peripheral surface, the worm wheel teeth being in mesh with the screw faces of the worm, the worm wheel teeth are formed so that the lead angle of the worm wheel is smaller than that of the worm.

4 Claims, 7 Drawing Sheets

WORM REDUCER AND ELECTRIC POWER STEERING APPARATUS

BACKGROUND OF THE INVENTION

1. Field of the Invention

This invention relates to a worm reducer for reducing the rotation transmitted to a worm and transmitting the reduced rotation to a worm wheel, and an electric power steering apparatus provided with the worm reducer.

2. Description of Related Art

In recent years, a vehicle is provided with an electric power steering apparatus for assisting steering by reducing the rotation of an electric motor prepared as a driving source for steering assistance through a reducing mechanism and transmitting the reduced rotation to a steering mechanism. Such an electric power steering apparatus adopts a worm reducer consisting of a worm and a worm wheel as a reducing mechanism for transmitting steering assistant force to a steering shaft by the electric motor.

FIG. 9 is a view showing a conventional worm reducer. FIG. 9(a) is a view showing a worm and FIG. 9(b) is a view showing the peripheral surface of a worm wheel. In FIG. 9(a), on the outer periphery of a worm 110 made of metal, screw faces 112 are formed to protrude from the outer peripheral surface 111 of the worm 110. On the other hand, in FIG. 9(b), on the peripheral surface of the worm wheel 120 made of synthetic resin, worm wheel teeth 121 in mesh with the screw faces 112 of the worm 110 are formed. The worm reducer used as a reducing mechanism of the electric power steering apparatus, which must has a reversely operable structure not permitting self-locking, provides large lead angles of the worm 110 and the worm wheel 120.

Further, in the conventional worm reducer, as seen from FIG. 9(b), the worm wheel teeth 121 on the peripheral surface of the worm wheel 120 are generally formed using a hob-cutter 130 as shown in FIG. 10. The hob-cutter 130 is provided with cutting blades 132 each having a slit 131 for tooth-cutting on the outer periphery. The peripheral surface of the worm wheel 120 is tooth-cut by the cutting blades 132 to form the worm wheel teeth 121.

If the diameter D1 of the hob-cutter 130 for making the worm wheel teeth 121 is equal to the diameter D2 of the worm 110 in mesh with the worm wheel 120, the meshing contact area between the worm 110 and the worm wheel 120 is large. As the diameter D1 of the hob-cutter 130 becomes larger than the diameter D2 of the worm 110, it becomes small. For this reason, in the case of the worm reducer requiring high endurance, generally, the meshing contact area between the worm 110 and the worm wheel 120 is increased to reduce the face pressure loaded on the tooth face.

However, in recent years, in the conventional worm reducer shown in FIG. 9, the strength of the synthetic resin constituting the worm wheel 120 was increased to improve the endurance. Correspondingly, shortage in the strength of the worm 110 occurred. The strength of the worm 110 can be increased by increasing the diameter D2 of the worm 110. In the conventional worm reducer, however, in view of structure, it was difficult to increase the diameter D2 of the worm 110 while keeping the predetermined wheel diameter of the worm wheel 120 and lead angle of the reversely operable worm 110.

Further, it is desirable that the hob-cutter 130 employed for making the worm wheel teeth 121 of the worm wheel 120 has the same diameter as that of the worm 110 in order to increase the meshing contact area between the worm 110 and the worm wheel 120. In this case, the cutting blades 132 of the hob-cutter 130, which have the slits 131, are weak in strength and so may be broken. In the conventional worm reducer, therefore, in making the tooth faces of the worm wheel 120, in view of strength, the hob-cutter 130 having a larger diameter than that of the worm 110 was required. Thus, as described above, since the diameter D1 of the hob-cutter 130 becomes larger than that of the worm 110, the meshing contact area between the worm 110 and the worm wheel 120 is decreased. This advantageously leads to an increase in the face pressure loaded on the tooth face.

Further, the conventional worm reducer is an orthogonal type in which the axial line of the rotary shaft of the electric motor coaxially connected to the worm 110 and the axial line of the steering shaft into which the worm wheel 120 is press-fitted are at right angles to each other in their non-crossing state. Therefore, the mounting layout of the electric motor was limited. Further, with progress of the high output power of the electric power steering apparatus in recent years, the worm wheel teeth 121 in mesh with the screw faces 112 of the worm 110 are required to have high strength. However, in the conventional orthogonal type worm reducer, it was difficult to assure sufficient strength of the worm wheel teeth 121.

Further, in the conventional worm reducer, where the tooth faces of the worm wheel 120 are formed using the hob-cutter 130 having the larger diameter than that of the worm 110, the lead angle of the hob-cutter 130 is different from that of the worm 110. Therefore, the tooth-cutting was made with their corrected angles so that the lead angle of the worm wheel 120 is fit to that of the worm 110 at pitch points. However, in these worm 110 and worm wheel 120, there was fear of generating interference at the area other than the pitch points. In order to avoid interference occurring in the area other than the pitch points, proposed was an obliquely crossing type worm reducer employing the worm wheel in which the tooth marks of the worm wheel teeth 121 remain unchanged in the tooth lines. In this case, however, the contacts at the mutual meshing area are point contacts and so the face pressure in the meshing area becomes high. As a result, the endurance of the worm reducer will be lowered.

SUMMARY OF THE INVENTION

This invention has been accomplished under the above circumstance. An object of the invention is to provide a worm reducer which can improve its downsizing and life by enhancing strength in an increased module while keeping the lead angle of a reversely operable worm and a center distance between the worm and worm wheel, and an electric power steering apparatus provided with such a worm reducer.

In order to achieve the above object, according to a first aspect of the invention, there is provided a worm reducer comprising:

a worm having a screw face on an outer circumferential surface thereof; and a worm wheel having worm wheel teeth formed on a circumferential surface thereof, the worm wheel teeth meshing with the screw face of the worm, wherein a rotation of the worm is reduced and transmitted to the worm wheel, and a lead angle of the worm wheel is smaller than that of the worm.

According to a second aspect of the invention, as set forth in the first aspect of the invention, it is preferable that the worm wheel teeth are formed on the peripheral surface of the worm wheel by using a machining electro-deposition worm having a machining screw face, a shape of the machining screw face is the same as that of the worm, and abrasive grains are electro-deposited on the machining screw face.

According to a third aspect of the invention, as set forth in the first aspect of the invention, it is more preferable that the worm wheel teeth are formed on the peripheral surface by using a machining electro-deposition worm having a machining screw face, abrasive grains are electro-deposited on the machining screw faces, a tooth shape of the machining screw face is the same as that of the screw face of the worm, and a diameter of the tooth tip circle and a diameter of the tooth base circle of the machining screw face are larger than those of the screw face of the worm.

According to a fourth aspect of the invention, there is provided an electric power steering apparatus comprising:

the worm reducer as set forth in the first aspect of the invention;

an electric motor having a rotary shaft connected to the worm; and a steering shaft of which outer periphery is press-fitted to the worm wheel press-fitted, wherein a rotation of the electric motor is reduced and transmitted to the steering shaft through the worm and the worm wheel to thereby assist steering operation.

In the worm according to the invention, since the worm wheel teeth are formed so that the lead angle of the worm wheel is smaller than that of the worm, the quantity of lead (pitch) of the worm wheel for each rotation of the worm can be reduced. For this reason, under the condition that the center distance between the worm and worm wheel and the reduction ratio of the worm reducer are fixed, the module of the worm wheel teeth can be increased as compared with the conventional worm reducer. As a result, the high strength of the worm and worm wheel can be realized. On the other hand, under the condition that the reduction ratio of the worm reducer and the module of the worm wheel teeth are fixed, the center distance between the worm and worm wheel can be decreased as compared with the conventional worm reducer. For this reason, the worm reducer can be downsized.

Further, in the worm reducer according to the invention, the worm wheel teeth are formed on the peripheral surface of the worm wheel using a machining electro-deposition worm in which abrasive grains are electro-deposited on the screw faces of another worm having the same shape as the worm to be combined with the worm wheel. Thus, since the lead angles at the area other than the pitch points of the worm wheel teeth can be also matched, interference can be avoided and further the tooth faces with a large contact area between the worm wheel teeth and the screw faces can be formed. As a result, the interference can be avoided without increasing the face pressure so that the endurance and abrasion-resistance of the worm reducer can be improved thereby preventing reduction in the life of the worm reducer.

Additionally, the machining electro-deposition worm may be employed in which abrasive grains are electro-deposited on screw faces of another worm having the same shape of tooth faces as that in the worm to be combined with the worm wheel and having a larger diameter of the tooth tip circle and a larger diameter of the tooth base circle than those of the worm. For this reason, the same advantage as that obtained when the machining electro-deposition worm having the same shape as that of the worm to be combined with the worm wheel can be obtained. In addition, tooth tip gaps when the worm to be actually meshed is combined with the worm wheel can be obtained. As a result, the dimension error and secular abrasion can be dealt with and the transmission efficiency can be improved.

Further, in the electric power steering apparatus according to the invention, as the reducing mechanism for transmitting the rotation of the electric motor for steering assistance to the steering mechanism, the above worm reducer is adopted.

Thus, life reduction of the device can be prevented. In addition, since the reducing mechanism is downsized, flexibility of the layout of the device can be improved.

DETAILED DESCRIPTION OF EXEMPLARY EMBODIMENTS OF THE INVENTION

Embodiments

Figure 1:
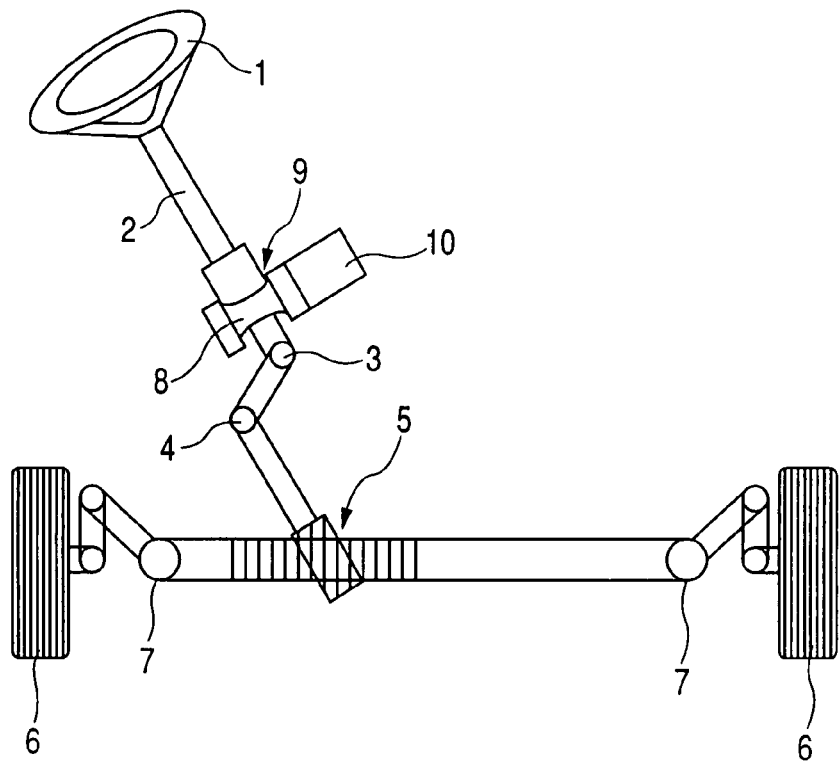
FIG. 1 is a view for explaining the schematic configuration of an electric power steering apparatus according to an embodiment of the invention.

Now referring to the drawings, an explanation will be given of embodiments of the invention.

FIG. 1 is a view for explaining the schematic configuration of a column type electric power steering apparatus according to this embodiment. In FIG. 1, a column shaft 2 of a steering handle 1 is connected to tie rods 7, 7 of steering wheels 6, 6 via universal joints 3, 4 and a pinion-rack mechanism 5. The column shaft 2 is provided with a reducing mechanism (or worm reducer) 9 incorporated within a housing 8. An electric motor 10 for steering assistance connected to the column shaft 2 through the reducing mechanism 9 is attached to the housing 8.

Figure 2:
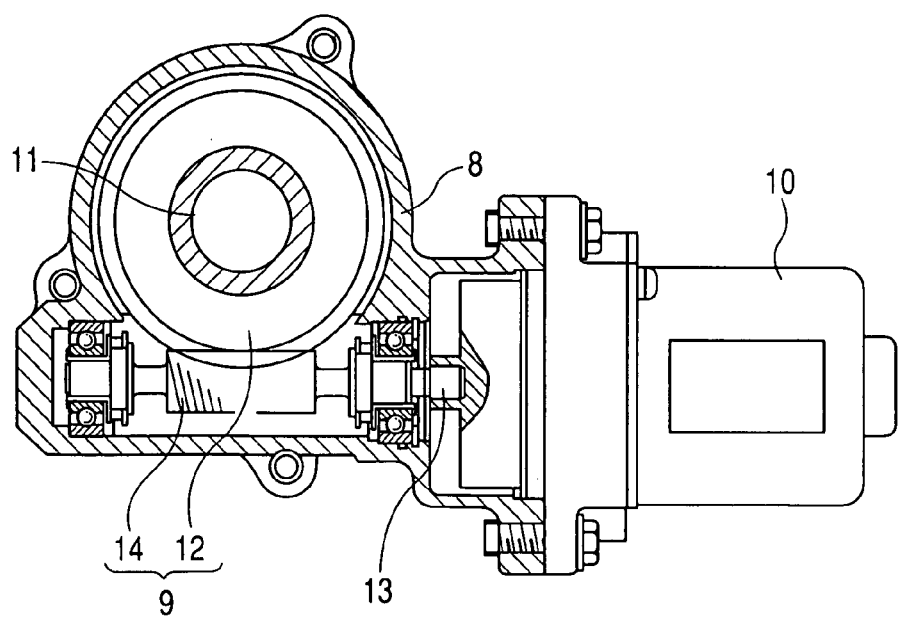
FIG. 2 is a sectional view of the main part of the reducing mechanism in a power steering device according to an embodiment of the invention.

FIG. 2 is a sectional view of the main part of the reducing mechanism 9 in a power steering device according to this embodiment. In FIG. 2, the housing 8 incorporates a worm wheel 12 press-fitted into the outer periphery of a steering shaft 11 extending from the column shaft 2 and a worm 14 coaxially to a rotary shaft 13 of the electric motor 10 so as to mesh with the worm wheel 12. Namely, the reducing mechanism 9 of the electric power steering apparatus according to this embodiment is the worm reducing mechanism 9 composed of the worm wheel 12 and worm 14 in which the rotation of the electric motor 10 reduced by the worm 14 and worm wheel 12 is transmitted to a steering shaft 11.

Referring to FIGS. 3 to 8, an explanation will be given of the worm reducer 9 according to this embodiment.

Figure 3A:
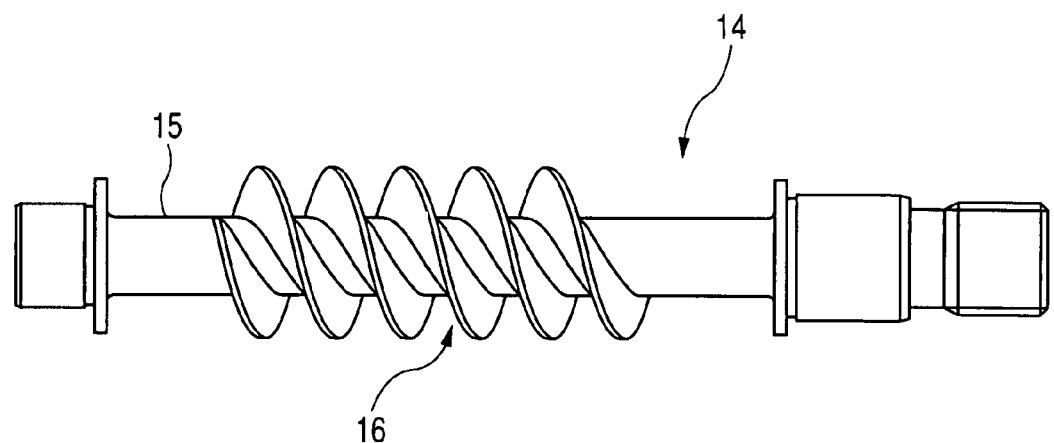
FIG. 3A is a view showing the worm of a worm reducer according to an embodiment of the invention.
Figure 3B:
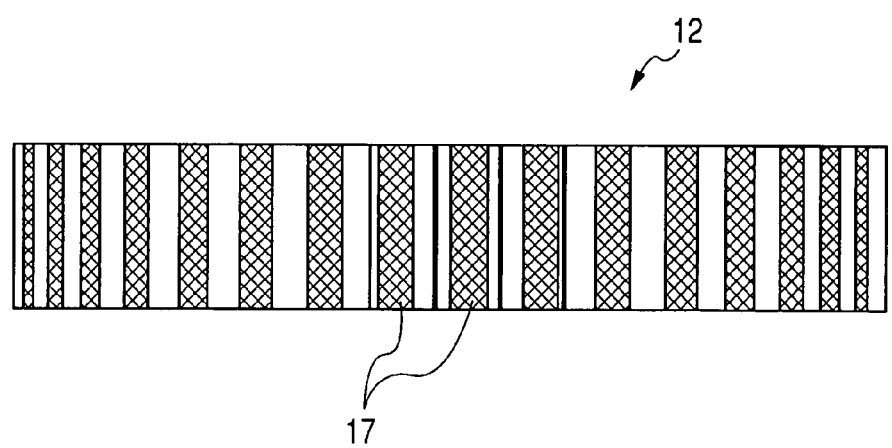
FIG. 3B is a view showing the peripheral surface of the worm wheel of the worm reducer of the embodiment of the invention.
Figure 4:
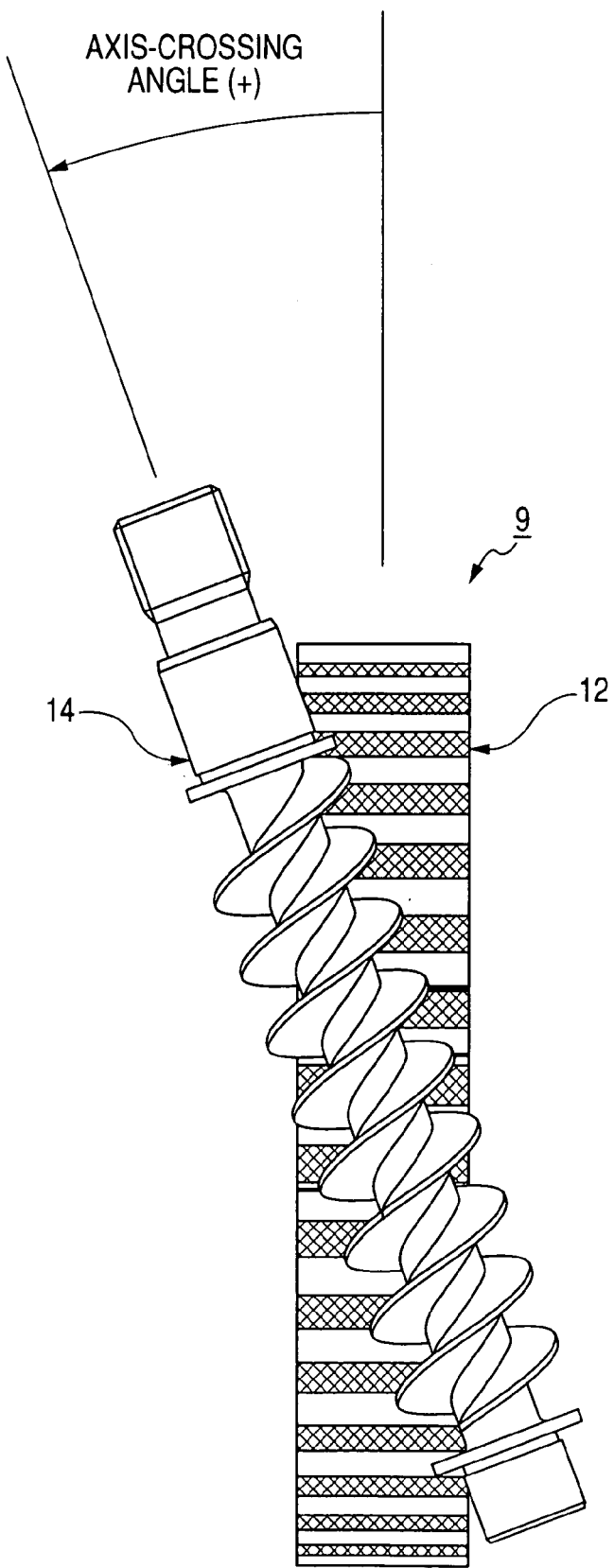
FIG. 4 is a top view showing the combined state of the worm and worm wheel of the worm reducer according to an embodiment of the invention.

FIG. 3 is a view showing the worm reducer 9 according to this embodiment. FIG. 3(a) is a view showing the worm 14 of the worm reducer 9. FIG. 3(b) is a view showing the peripheral surface of the worm wheel 12 of the worm reducer 9. FIG. 4 is a top view showing the combined sate of the worm 14 and worm wheel 12 of the worm reducer 9 according to this embodiment.

In FIG. 3(a), on the outer periphery of the worm 14 made of metal, screw faces 16 are formed to protrude from the outer peripheral surface 15 of the worm 14. On the other hand, in FIG. 3(b), on the peripheral surface of the worm wheel 12 made of synthetic resin, worm wheel teeth 17 in mesh with the screw faces 16 of the worm 14 are formed. In the worm reducer 9 according to this embodiment, the lead angle of the worm wheel 12 is smaller than that of the worm 14. As seen from FIG. 4, the worm 14 and the worm wheel 12 are combined with each other in a state where their axial lines obliquely cross each other.

Figure 5:
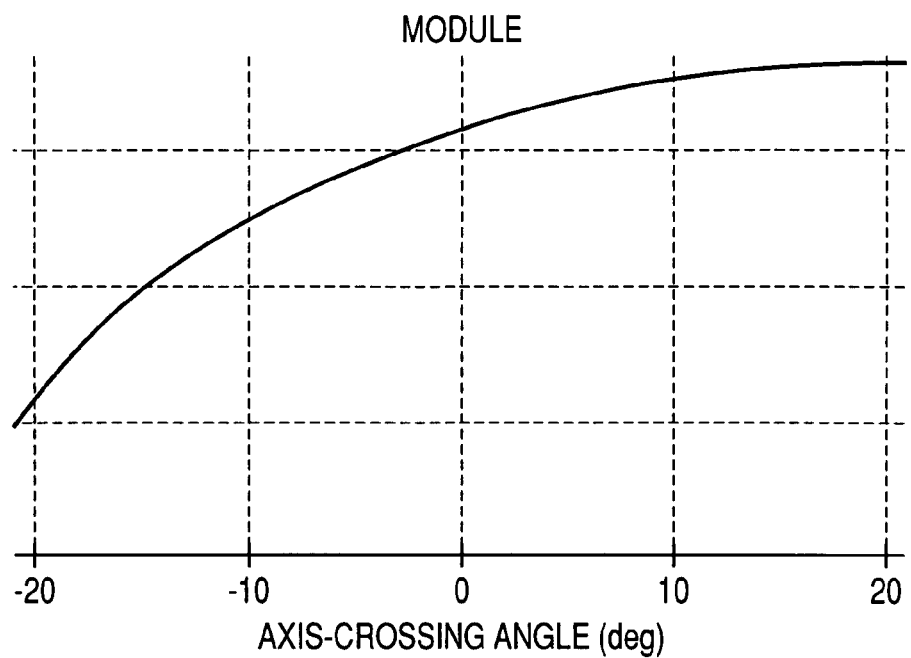
FIG. 5 is a graph showing the relationship between the axis-crossing angle of the worm and the worm wheel and the module of the worm wheel where the reduction ratio of the worm reducer and the center distance between the worm and worm wheel are fixed.

FIG. 5 is a graph showing the relationship between the axis-crossing angle of the worm and worm wheel and the module of the worm wheel where the reduction ratio of the worm reducer and the center distance between the worm and worm wheel are fixed. In the graph, it can be seen that the module of the worm wheel increases as the axis crossing angle increases. Therefore, in the worm reducer 9 according to this embodiment, since the lead angle of the worm wheel 12 is smaller than that of the worm 14, the quantity of lead (quantity of pitch) of the worm wheel 12 for each rotation of the worm 14 can be reduced. Thus, the maximum module of the worm wheel 12 can be increased. As a result, the high strength of the worm wheel 12 and worm 14 can be realized.

Figure 6:
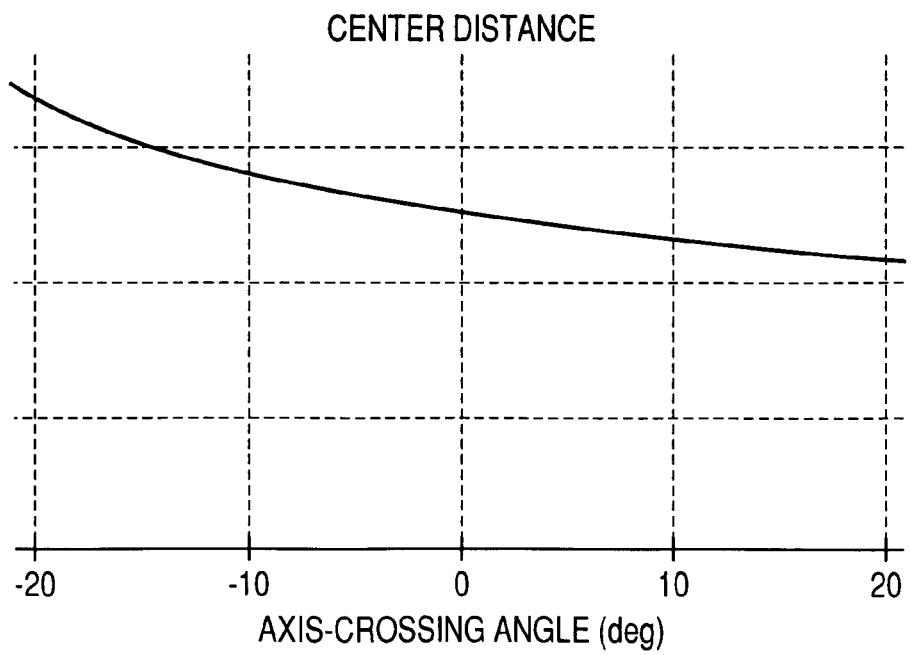
FIG. 6 is a graph showing the relationship between the axis-crossing angle of the worm and worm wheel and the center distance therebetween where the reduction ratio of the worm reducer and the module of the worm wheel are fixed.

FIG. 6 is a graph showing the relationship between the axis-crossing angle of the worm and worm wheel and the center distance therebetween where the reduction ratio of the worm reducer and the module of the worm wheel are fixed. In the graph, it can be seen that the center distance between the worm and worm wheel decreases as the axis-crossing angle increases. For this reason, the worm reducer 9 according to this embodiment can be also downsized by decreasing the center distance between the worm 14 and worm wheel 12.

Figure 7:
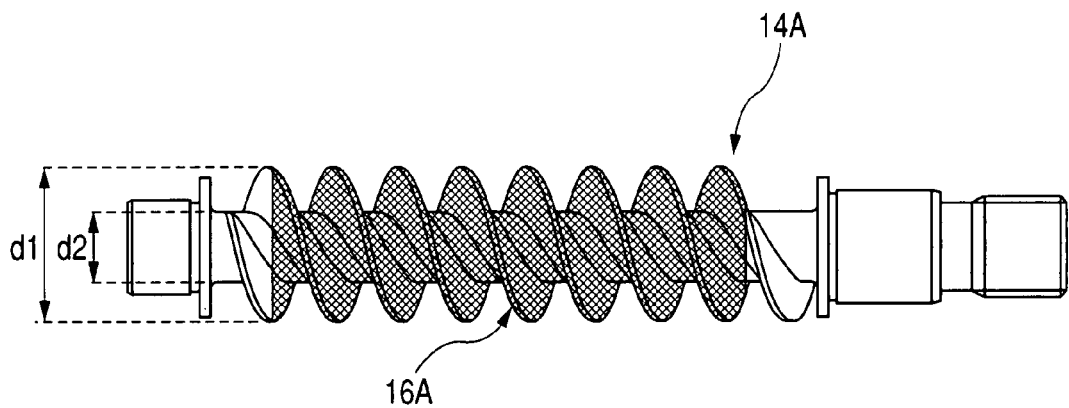
FIG. 7 is a view showing a machining tool for machining the worm wheel teeth of the worm wheel of the worm reducer of the invention.
Figure 8A:
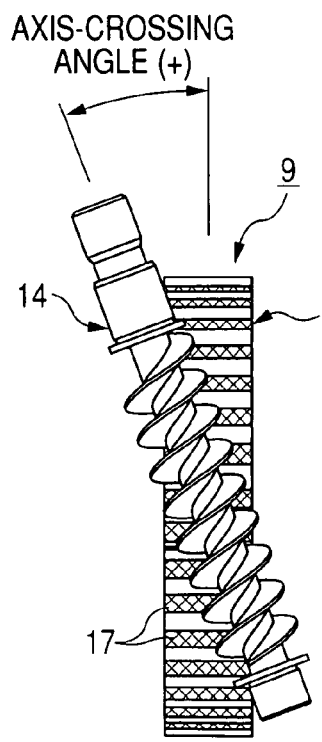
FIG. 8A is a view showing the axis-crossing angle between the worm wheel and a worm in a worm reducer of the invention.
Figure 8B:
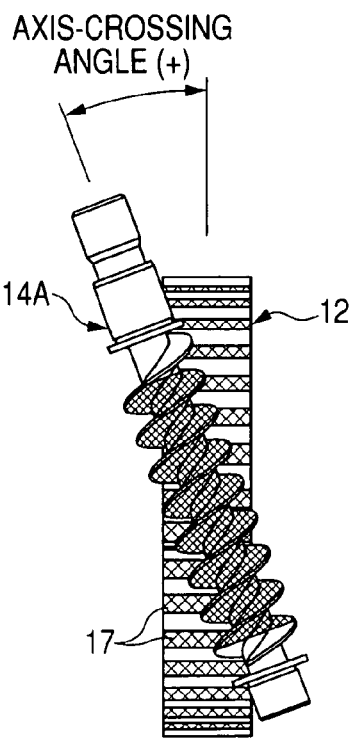
FIG. 8B is a view showing the axis-crossing angle between the worm wheel and an electro-deposition worm of the invention.
Figure 8C:
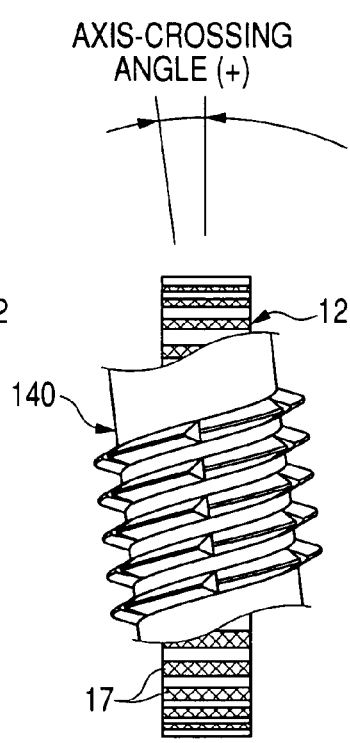
FIG. 8C is a view showing the axis-crossing angle between the worm wheel and a known hob-cutter.
Figure 9A:
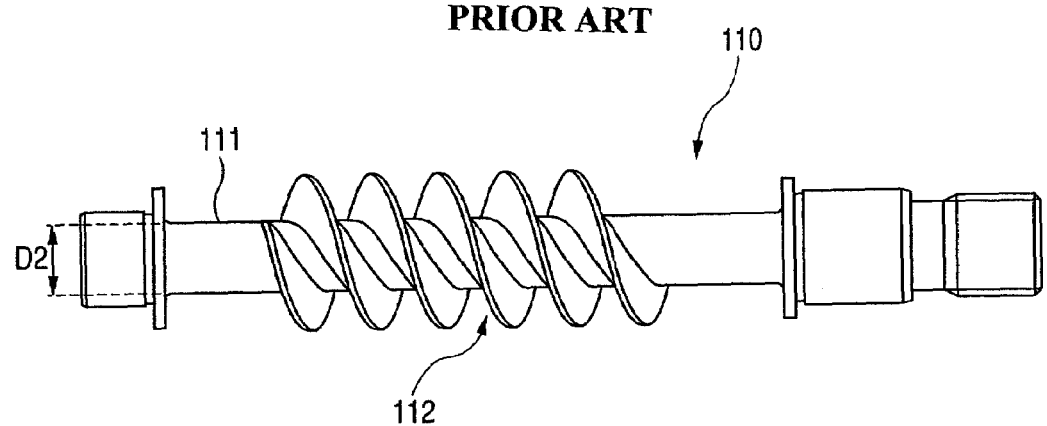
FIG. 9A is a view showing a worm in the worm reducer of the related art.
Figure 9B:
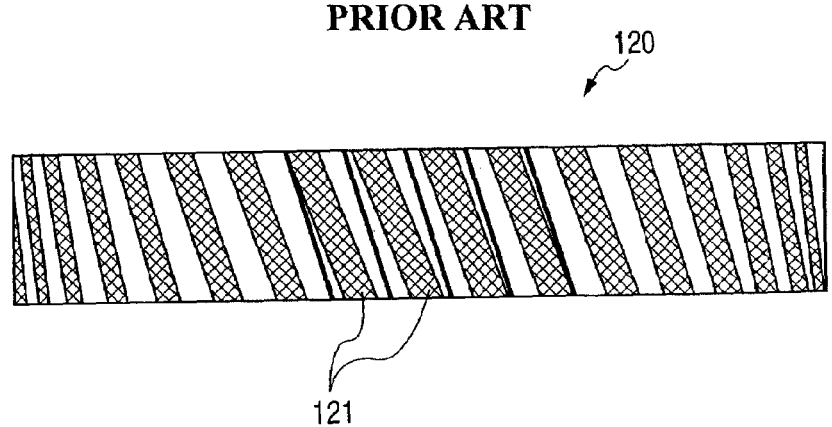
FIG. 9B is a view showing the peripheral surface of the worm wheel in the worm reducer of the related art.
Figure 10:
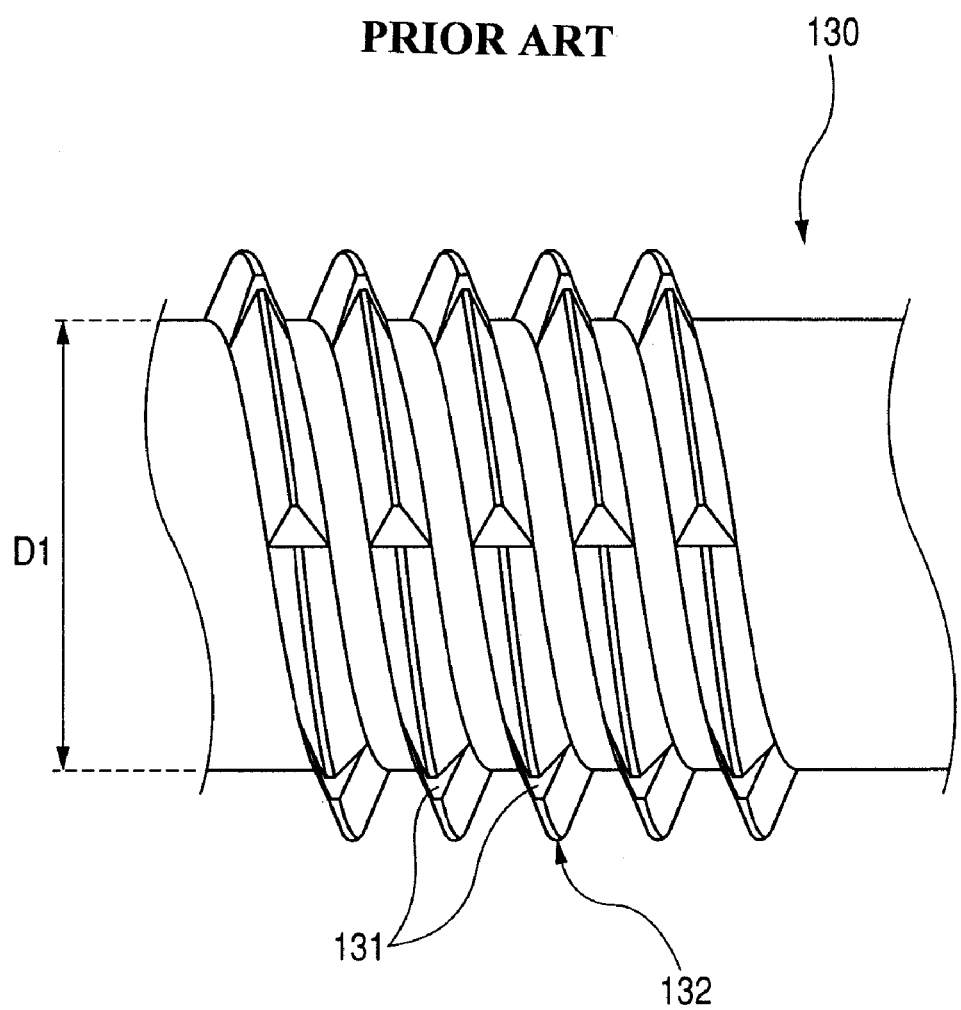
FIG. 10 is a view showing a machining tool for machining worm wheel teeth on the worm wheel in a worm reducer of the related art.

FIG. 7 is a view showing a machining tool for making the worm wheel teeth 17 of the worm wheel 12 of the worm reducer 9 according to this embodiment. FIG. 8 is views for explaining the comparison between the axis-crossing angle when the machining tool according to this embodiment is employed and the axis-crossing angle when the hob-cutter 130 which is a traditional machining tool is employed. As seen from FIG. 7, in this embodiment, as a machining tool for making the worm wheel teeth 17, a machining electro-deposition worm 14A is employed in which abrasive grains are electro-deposited on screw faces 16A of the worm having the same shape as the worm 14.

Where the worm wheel teeth 17 of the worm wheel 12 according to this embodiment are made using the traditional hob-cutter 130 (see FIG. 10), since the axis-crossing angle (FIG. 8(c)) between the hob-cutter 130 which is the machining tool and the worm wheel 12 is different from the axis-crossing angle (FIG. 8(a)) between the worm 14 and worm wheel 12 which are actually combined, as the case may be, the interference in the area other than the pitch points of the meshing area cannot be avoided. However, in this embodiment, since the worm wheel teeth 17 are made using the machining electro-deposition worm 14A having the same shape as the worm 14, the axis-crossing angle (FIG. 8(b)) between the machining electro-deposition worm 14A which is the machining tool and the worm wheel 12 can be made in agreement with the axis-crossing angle (FIG. 8(a)) between the worm 14 and worm wheel 12 which are actually combined. Thus, the lead angles at the area other than the pitch points in the meshing area can be also matched with each other. As a result, the interference can be avoided without increasing the face pressure in the meshing areas so that life reduction of the worm reducer 9 can be prevented.

Additionally, in this embodiment, as the machining electro-deposition worm 14A, the worm having the same shape as that of the worm 14 was employed. However, without being limited to it, the worm maybe employed in which abrasive grains are electro-deposited on screw faces of another worm having the same shape of tooth faces (screw faces) as that in the worm 14 and having a larger diameter of the tooth tip circle (d1 in FIG. 7) and a larger diameter of the tooth base circle (d2 in FIG. 7) than those of the worm 14. For this reason, the same advantage as that obtained when the machining electro-deposition worm 14A is used can be employed. In addition, tooth tip gaps when the worm 14 and the worm wheel 12 are combined can be obtained. As a result, the dimension error and secular abrasion can be dealt with and the transmission efficiency can be improved.

This invention should not be limited to the embodiment hitherto explained, but can be appropriately changed without departing from the spirit of the invention.

What is claimed is:

1. A worm reducer comprising:
   a worm having a screw face on an outer circumferential surface thereof, said worm having a first longitudinal axis; and
   a worm wheel having worm wheel teeth formed on a circumferential surface thereof, the worm wheel teeth meshing with the screw face of the worm, said worm wheel having a second longitudinal axis,
   wherein:
      a rotation of the worm is reduced and transmitted to the worm wheel,
      a lead angle of the worm wheel is smaller than that of the worm,
      a diameter of the tooth tip circle of the worm is constant,
      a diameter of the tooth base circle of the worm is constant,
      respective lead angles of the teeth on the worm are the same, and
      an axis-crossing angle, defined by an angle between the first longitudinal axis of the worm and the second longitudinal axis of the worm wheel, is greater than zero.

2. The worm reducer according to claim 1, wherein the worm wheel teeth are formed on the peripheral surface of the worm wheel by using a machining electro-deposition worm having a machining screw face, a shape of the machining screw face is the same as that of the worm, and abrasive grains are electro-deposited on the machining screw face.

3. The worm reducer according to claim 1, wherein the worm wheel teeth are formed on the peripheral surface by using a machining electro-deposition worm having a machining screw face, abrasive grains are electro-deposited on the machining screw faces, a tooth shape of the machining screw face is the same as that of the screw face of the worm, and a diameter of the tooth tip circle and a diameter of the tooth base circle of the machining screw face are larger than those of the screw face of the worm.

4. The electric power steering apparatus comprising:

the worm reducer according to claim 1;

an electric motor having a rotary shaft connected to the worm; and a steering shaft, to an outer periphery of which the worm wheel is press-fitted, wherein a rotation of the electric motor is reduced and transmitted to the steering shaft through the worm and the worm wheel to thereby assist steering operation.

\* \* \* \* \*